United States Patent Office 3,682,645
Patented Aug. 8, 1972

---

3,682,645
DETOXIFICATION OF GOSSYPOL BY EUMYCOPHYTA
Thomas Colin Campbell, Blacksburg, Va., assignor to Research Corporation, New York, N.Y.
No Drawing. Filed Jan. 20, 1970, Ser. No. 4,428
Int. Cl. A23k 1/00; A23l 1/20
U.S. Cl. 99—9
1 Claim

ABSTRACT OF THE DISCLOSURE

Cultivation of a fungal micro-organism of the phylum Eumycophyta on cottonseed detoxifies gossypol making the cottonseed suitable for use in a feedstuff intended for monogastric animals.

---

Cotton plants, grown primarily for their fiber, yield about 180 pounds of cottonseed per 100 pounds of fiber. Byproduct cottonseed can be used as a protein supplement in animal rations, particularly those intended for ruminants. It is the better economic practice to first separate cottonseed oil and then use the residual cottonseed cake or meal containing 40% protein as an animal feedstuff supplement.

The use of cottonseed meat, cake or meal in feedstuffs intended for monogastric livestock, such as swine or poultry, has been greatly limited by the presence in glanded cottonseed of a toxic polyphenolic factor designated gossypol. This factor consists primarily of yellow coloring matter located in the pigment glands of glanded cottonseed and constitutes about 1–2% by weight of the seed kernel. The gossypol may be in relatively soluble "free" form or "bound" in an insoluble form, presumably to a protein molecule. Toxicity is generally attributed to the free form and bound gossypol is considered relatively non-toxic.

Procedures such as heating or cooking, treatment with alkali, addition of iron salts, inclusion of lysine or combination with other dietary proteins all reduce gossypol toxicity. However, these procedures have limited value in practice. A variety of glandless cottonseed low in gossypol has been developed but it may be some time before a hardy strain becomes available and is accepted for general use by cotton producers.

It is, therefore, a principal object of the present invention to provide a method for the detoxification of gossypol present in cottonseed.

It is a further object of the invention to provide a detoxified cottonseed suitable as a protein supplement in feedstuffs intended for monogastric livestock.

Accordingly, I have now discovered that when a fungal microorganism of the phylum Eumycophyta is cultivated on cottonseed meat or meal the toxicity attributed to the gossypol present is drastically reduced. The detoxified cottonseed can then be utilized without adverse effect in feedstuff rations intended for monogastric livestock.

More specifically, the present invention is a method for the detoxification of cottonseed containing gossypol which comprises cultivating a microorganism of the phylum Eumycophyta on the cottonseed to be detoxified. My invention also contemplates the detoxified cottonseed resulting from the method of the invention.

In a preferred manner of practicing the method of the present invention, the cottonseed to be detoxified is inoculated with spores from a member of the phylum Eumycophyta, e.g., fungi of the genera Diplodia, Aspergillus, Penicillium, Rhizopus, Fusarium, Alternaria, Collectotrichum, Nigrospora and the like, and the fungal organism cultivated on the cottonseed for several days. A particularly advantageous detoxification of the gossypol initially present is obtained with fungi of the genus Diplodia; the method of the invention is illustrated by means of examples utilizing fungi of that genus.

Finely ground cottonseed meats were prepared from dehulled cottonseed and 0.25 g. test samples were placed in 8-oz. screw cap jars. To the control samples was added 0.75 ml. of sterile distilled water and 0.25 ml. of an 0.05% Aureomycin solution (to inhibit bacterial growth). The control samples were incubated at 5° C. for 15 days. To the remaining samples was added 0.75 ml. of the spore suspension being tested and 0.25 ml. of the Aureomycin solution. The test samples were incubated at 27±2° C. for 13 days. An additional 1 ml. of water was added on days 2 and 6 to promote growth, and all samples were aseptically stirred on days 2, 6 and 10. Representative samples were analyzed for gossypol at days 0, 1, 2, 3, 4, 5, 6, 7, 10, and 13 according to the method of Smith, J. Am. Oil Chem. Soc., 35, 261 (1958) and for free gossypol according to the H.E.W. Food Additives Analytical Manual, vol. I, method 121.1019; bound gossypol was calculated by difference.

At least a portion of the reduction in free gossypol observed can be attributed to the addition of water. For example, the control samples incubated for 15 days with water showed an average reduction in free gossypol from 0.91% to 0.73%. This effect is not due solely to dilution of the gossypol with water; see Bressani et al., Food Tech., 18, 95 (1961).

Of the many fungal species representing various genera of Eumycophyta tested, the Diplodia species *Botryodiplodia theobromae* Pat., available under that name from the American Type Culture collection resulted in the greatest reduction of free gossypol and overall detoxification when evaluated in animal feedstuffs. This same species is also known by the names *Lasiodiplodia theobromae* (Pat.) Griff and Maubl and *Diplodia natalensis*. Spore suspensions of Diplodia used for inoculation were prepared by adding 50 ml. of distilled water to a Roux bottle containing a 2-week-old potato-dextrose agar culture of the microorganism being tested. The free gossypol content of the samples inoculated with *Botryodiplodia theobromae* was reduced to about 0.20% on day 6 and 0.08% on day 13. Bound gossypol began decreasing after 6 days from 0.94% on day 6 to 0.63% on day 13.

Cottonseed detoxified by inoculation and cultivation with Diplodia spores was evaluated as a feedstuff in Sprague-Dawley derived male weaning rats. The test animals were fed a diet containing a mixture of one part of a nutritionally adequate basal diet mixture containing the following ingredients:

| | Percent |
|---|---|
| Sucrose | 66.0 |
| Casein | 22.2 |
| Corn oil | 5.0 |
| Jones-Foster mineral mixture | 4.0 |
| Vitamin dietary fortification mixture | 2.2 |
| L-lysine | 0.4 |
| DL-methionine | 0.2 | in combination with one part of cottonseed meat incubated for 10 days with the Diplodia spores. The level of free gossypol in cottonseed meat detoxified with *Botryodiplodia theobromae* was 0.52% and in the combined diet ration 0.26%. Group I rats were given free access to the mixed dietary ration; group II rats were given free access to a 1:1 mixture of uninoculated control cottonseed meats and basal diet mixture; and group III rats were fed the same diet as group I except they were limited to the same weight intake as the control animals of group II. Daily weight gain or loss and food consumption were recorded.

Group II animals fed uninoculated cottonseed exhibited the characteristic symptoms of gossypol toxicity, i.e., appetite and weight depression, dyspnea, lack of vigor and fluid accumulation in body cavities and intestines; they were very near death by day 8. Group III animals fed the same amount of total gossypol as found in the moldy cottonseed lost less weight and only appeared hungry on day 8; no adverse pathological symptoms were observed. A very striking difference was observed in the group I animals free fed the moldy cottonseed. In spite of their apparent consumption of six times more gossypol than fed the animals of group II, the group I animals gained moderate weight and maintained a healthy appearance.

The test rats were killed at intervals and their lungs and livers analyzed for total gossypol essentially according to the method of Smith, J. Am. Oil Chem. Soc., 42, 145 (1965). The concentrations of gossypol found clearly reflect the gross toxicity observed. The highest tissue concentrations of gossypol were found in the group fed the uninoculated cottonseed. Cultivation of the cottonseed meat with Diplodia not only reduced the amount of free gossypol but resulted in detoxification of the remaining gossypol. For example, the apparent consumption of three times the quantity of free gossypol per day by group I, as compared to group II, still elicited no toxic symptoms. The results obtained are summarized below:

| Group: | Gossypol consumption (mg./day) | | Weight change (g./day) | | Feed consumed (g./day) | | Liver gossypol (mg./g.) | | Lung gossypol (mg./g.) | |
|---|---|---|---|---|---|---|---|---|---|---|
| | Total | Free | Days 0–3 | Days 4–8 | Days 0–3 | Days 4–8 | Day 3 | Day 8 | Day 3 | Day 8 |
| 1 | 36.5 | 17.7 | +4.3 | +4.4 | 5.7 | 7.1 | 0.043 | 0.036 | 0.032 | 0.005 |
| 2 | 6.5 | 5.5 | −3.2 | −1.5 | 1.2 | 1.1 | 0.167 | 0.075 | 0.098 | 0.051 |
| 3 | 6.5 | 3.0 | −1.6 | −0.5 | 1.2 | 1.1 | 0.026 | 0.027 | 0.045 | 0.0 |

These above findings were confirmed in additional studies on white Leghorn cockerals 12–14 weeks of age. Incubation with Diplodia again reduced the amount of free gossypol in cottonseed and also the toxicity of the remaining free gossypol when treated cottonseed meats were used in conjunction with a poultry ration. The weight gain and feed consumption over a 6-day period were as follows:

Group I—50% poultry starter ration and 50% untreated cottonseed meats.

Group II—50% starter ration, and 50% detoxified cottonseed meats.

Group III—71% starter ration, and 29% untreated cottonseed meats (this amount of cottonseed meats gave a ration content of gossypol equivalent to the level in the group II ration).

| Group: | Feed consumption (g./day) | Weight change (g./day) |
|---|---|---|
| I | 15.8 | −18.7 |
| II | 33.7 | +8.0 |
| III | 23.7 | −12.3 |

In another series of experiments, spores of 16 Eumycophyta species were separately inoculated upon Acala variety glanded cottonseed and incubated for seven days at 30° C. Each incubated substrate was then ground and mixed with equal parts of a semi-purified ration containing:

| | Percent |
|---|---|
| Casein | 20 |
| Sucrose | 69.8 |
| Salt mixture | 4.0 |
| Corn oil | 4.0 |
| Complete vitamin mixture | 2.2 | and fed to at least three weanling rats. Uninoculated glanded cottonseed mixed with equal parts of the above mixture was used as the control ration. All animals were fed for periods ranging from 10–28 days. The results observed are summarized as follows:

| | Number of animals | Food consumption (gm./day) | Weight gain (gm./day) |
|---|---|---|---|
| Control | 14 | 7.4 | 0.6 |
| Detoxified cottonseed (average) | 50 | 11.7 | 4.1 |
| Diplodia detoxified cottonseed | 6 | 17.7 | 4.3 |

Other variations in the above-described method will suggest themselves to those skilled in the art and my invention is as claimed.

I claim:
1. A method for the detoxification of cottonseed containing gossypol which comprises cultivating the microorganism, *Botryodiplodia theobromae* Pat., on the cottonseed to be detoxified.

References Cited

U.S. Dept. of Agriculture, "Proceedings of the Cottonseed Processing Clinic," 1964, pp. 49–52.

Chemical Abstracts, vol. 64, 1966, 20011a, Mayne et al.

L. A. Goldblatt: "The Mycotoxin Problem," June 14, 1965.

Chemical Abstracts, vol. 67, 1967, 71198q, A. A. Bell.

A. Ciegler et al.: Applied Microbiology, vol. 14, 1966, pp. 934–939, "Microbial Detoxification of Aflatoxin."

Chemical Abstracts, vol. 51, 1957, 13080h, Zuber et al.

NORMAN YUDKOFF, Primary Examiner

C. P. RIBANDO, Assistant Examiner

U.S. Cl. X.R.

99—2, 8; 195—2, 81